Figure 1:
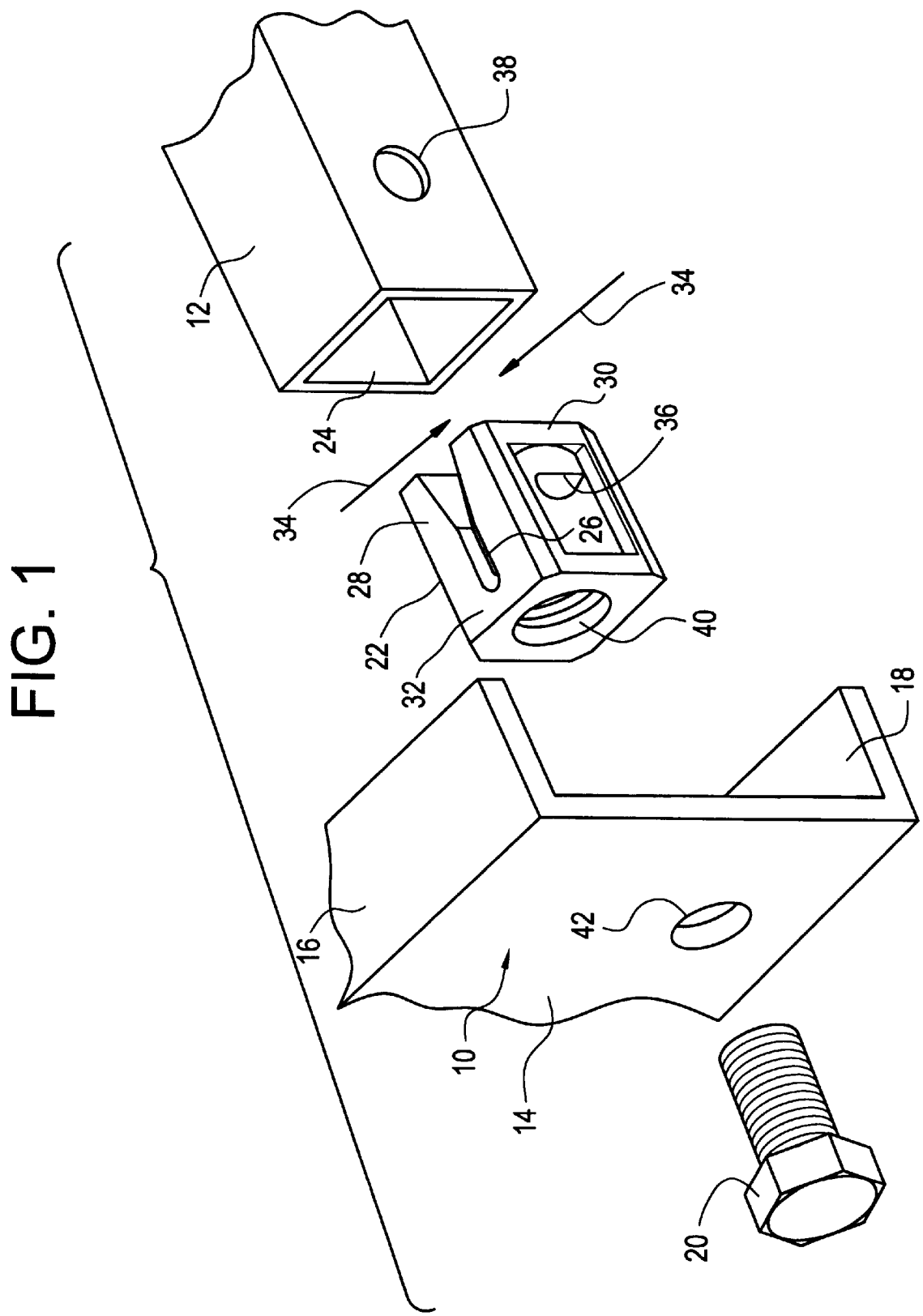

United States Patent [19]
Took

[11] Patent Number: 6,155,741
[45] Date of Patent: Dec. 5, 2000

[54] FASTENING DEVICES

[75] Inventor: Ian Frank Took, Prestatyn, United Kingdom

[73] Assignee: Mita (UK) Ltd, Bodelwyddan, United Kingdom

[21] Appl. No.: 09/101,547

[22] PCT Filed: Nov. 28, 1996

[86] PCT No.: PCT/GB96/02929

§ 371 Date: Jul. 13, 1998

§ 102(e) Date: Jul. 13, 1998

[87] PCT Pub. No.: WO97/25541

PCT Pub. Date: Jul. 17, 1997

[30]    Foreign Application Priority Data

Jan. 12, 1996 [GB]   United Kingdom ................... 9600638

[51] Int. Cl.⁷ .................................................. F16B 21/07
[52] U.S. Cl. ........................ 403/260; 403/329; 403/408.1
[58] Field of Search ................................... 403/256, 258, 403/260, 230, 231, 329, 408.1, DIG. 12; 411/55, 60.2, 71, 72, 73, 74; 182/228.1, 228.3, 228.6, 228.2

[56]    References Cited

U.S. PATENT DOCUMENTS

| 2,393,606 | 1/1946 | Brush . |
| 3,082,807 | 3/1963 | Tinnerman ................................. 411/15 |
| 3,628,816 | 12/1971 | Ross, Jr. .................................. 403/256 |
| 4,502,810 | 3/1985 | Nock ........................... 403/DIG. 12 X |
| 4,760,495 | 7/1988 | Till .................................. 403/408.1 X |
| 5,016,141 | 5/1991 | Lorig et al. .............................. 361/415 |
| 5,106,225 | 4/1992 | Andre et al. .......................... 403/408.1 |

FOREIGN PATENT DOCUMENTS

| 0278995 | 2/1997 | European Pat. Off. . |
| 2343153 | 9/1977 | France . |
| 2814969 | 10/1979 | Germany . |
| 4440220 | 5/1995 | Germany . |
| 0993633 | 6/1962 | United Kingdom . |
| 1028684 | 5/1966 | United Kingdom . |
| 1083032 | 9/1967 | United Kingdom . |
| 1142763 | 2/1969 | United Kingdom . |
| 1566914 | 5/1980 | United Kingdom . |

*Primary Examiner*—Lynne H. Browne
*Assistant Examiner*—John R Cottingham
*Attorney, Agent, or Firm*—Klauber & Jackson

[57]    ABSTRACT

A fastening device comprising a block of plastic material of square or alternative cross section. The block has a threaded bore for the receipt of a bolt which completes the fastening, and additionally, the block has a through slot extending from one end making the block of a U-shape so that it has legs and a base. This configuration is such that the legs can be sprung together so that they can be pushed into the end of a square sectioned cable ladder tube to be connected at right angles to a cable ladder rail, whereupon the legs will spring apart so that a projection on the legs engage in apertures in the tube walls and the block cannot be retracted. To secure the rail to the tube end, the bolt is passed through a hole in the rail and is screwed into the block, which is locked in the tube end. The advantages are pre-insertion of the blocks in the factory and simple assembly of the cable ladder on site, and secure connection joining of the rail and tube ends.

8 Claims, 2 Drawing Sheets

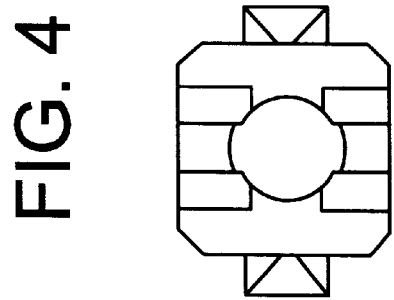
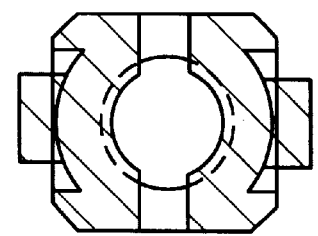
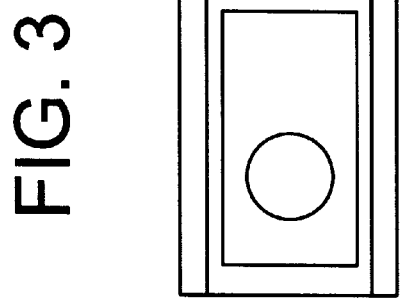
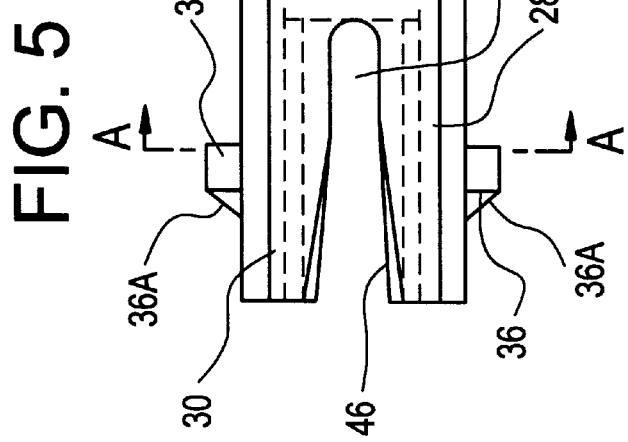
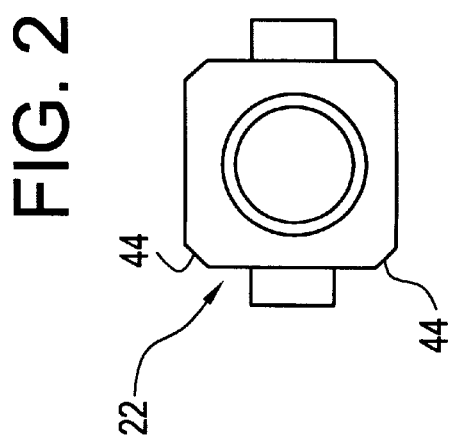

FASTENING DEVICES

This invention relates to fastening devices, for the connecting of two members together, and the invention has particular application to the connecting of rungs and rails of cable management ladders which are manufactured from synthetic plastic materials in particular glass reinforced plastics materials and of which the rails and rungs are formed by extrusion or pultrusion. These fastening devices require to provide a strong coupling, as the cable management ladders are often suspended at high levels and can carry large amounts of weighty cables and pipes. Also although not intended workmen will often use the ladders for supporting their weight for example in cases of emergency or need.

GRP cable ladders comprise side rails and rungs, and the rungs, of the type to which the present invention relates, are tubular members which are "closed" insofar as in cross section they have continuous peripheries or in other words they are not provided with any longitudinal slots, or are provided with such slots or are channel sectioned in which case they will also be provided with peripheral anti-splaying holding bands or ferrules, making them in effect "closed", and the expression "closed" as used hereinafter is intended to cover all such arrangements. The invention has particular and exclusive application to the connecting of these tubular members to other members. In relation to the cable ladders therefore reference will be made to closed rungs which will be understood to be constructed as described above.

The side rails to which the closed rungs are connected in GRP cable ladders typically are of channel section and comprise a base portion and side flanges. There may be one or more intermediate flanges between the side flanges to split the rail into several cavities. In the constructed ladder; the ends of the rungs abut the inner base surfaces, and fixing of the rungs is effected by boring a fixing aperture through at least one of the side or intermediate flanges, and opposed locations through the rung end, and then a fixing bolt is passed through the aligned apertures and is securely by means of a nut and a washer. The head of the bolt will typically lie within the rail cavity. As mentioned above, these fastenings require to provide secure connections which can take a significant load.

Fixing in this manner is in fact slow, because in any cable management system there may be a considerable length of cable ladder to be installed, which will involve a large number of rungs. Additionally, the bolt heads can be the cause of snagging when lengths of cable ladder are moved from place to place on site. Finally, the nuts also form projections which can interfere with the positioning of the cables to be supported by the ladder and can snag with such cables. The main disadvantage however is the length of time it takes to apply the bolts, and there is an ancillary disadvantage that it is not always easy to apply the nuts, because the inner ends of the bolts may be inaccessible.

In the prior art there are a number of fixing or fastening devices, and for example various screw fastening devices are disclosed in UK patents Nos. 1142763, 1083032, 1028684 and 993633. Generally, the devices disclosed in these patents, with the exception of 1083032, are sheet metal fabrications which provide a means into which a screw or bolt can be tightened, to for example attach an electrical cable or a panel, or assemble cabinets. Patent No. 1083032 also discloses a device for connecting panels, but provides a plastic nut which is in two parts which are connected by a hinge portion, and the parts are hinged together to form the nut which can then be inserted in a panel hole for the receipt of a bolt.

The plastic nut of patent No. 1083032 is quite unsuitable for the application of the present invention, and the fabricated sheet metal devices of the other specifications would not provide enough strength in the fastening to be suitable for cable ladders. Additionally, the sheet metal fixing devices are not as convenient to use as the devices according to the invention, as will be seen from the following.

The present invention seeks to provide a fixing or fastening device which is usable for connecting two members together, and which will provide a fastening of sufficient strength to be applicable to the connection of GRP cable ladder rails to GRP cable ladder rungs which are closed tubes.

In accordance with the invention, an assembly for a cable ladder comprises a closed tube and a second member attached thereto by means of a fastening device and threaded fixing member, said fastening device being a plastic block defining a U-shaped collet having a base and a pair of legs which is inserted into the end of the closed tube with clearance but in neat fitting fashion, the base providing resiliency so that the legs at the free ends can be sprung together and pushed into the end of the closed tube, the tube having aperture or internal recess means in the walls thereof to receive projection means extending outwardly on the legs of the collet, the collet furthermore having a bore which extends through the base and is partially defined in the inner surfaces of each of said legs, said bore being threaded over at least a substantial portion of the legs to receive said threaded fixing member after insertion of the collet into the end of the closed tube, said threaded member passing through a bore in a base section of said second member and into the bore of the collet, characterized in that as the threaded fixing member is received in the bore of the collet, the legs of the collet are forced apart and wedge against the inner surface of the closed tube and both collet and closed tube are tightened against and pulled towards the inner surface of the base portion of the second member.

By providing such construction, firm anchoring of the second member may be achieved in that the threaded bore has sufficient threads to achieve good anchoring of the threaded fixing member, in practice a bolt. Also, when the collet is first inserted it is preferred that the legs are slightly inclined towards each other so that the bore tapers. Thus, when the bolt is screwed into the collet, it forces the legs apart, enhancing the fixing effect by the combination of wedging and screwing.

There are preferably two of said projection means on the outsides of the respective legs, which are adapted to spring into apertures in opposed walls of the said closed tube.

The said bore may be partially formed by an aperture in the common end, and opposed groves in the opposite faces of the legs.

The collet preferably will be formed of a plastic material which has sufficient springiness to enable the legs to be resiliently deflected together, and to spring apart to perform the function as above described. The block forming collet may have a core of defined by one or more strips of spring steel around which the plastics material is formed, but in the preferred case, the block is a one piece injection moulding of plastics material.

When the invention is applied to GRP cable ladder, the second member may be a cable ladder side rail and for the connection of the side rail to the end of the closed rung in which the collet is provided, an aperture is simply provided in the base of the side rail, and then the bolt is passed through the aperture and into the collet bore. The bolt is tightened, causing the collet and therefore the end of the rung to be tightened against the inner surface of the base portion of the side rail forming a firm and secure anchor between the rung end and the side rail.

The projection means on the collar may simply comprise cylindrical protrusions which are chamfered at one side to ease the insertion of the collet into the end of the closed tube, but the collet has best application in connection with tubes which are of sufficient wall thickness, such as GRP tubes to enable the pips to catch effectively in the recess or apertures.

It will be understood from the above that the rungs of a cable ladder can be provided in the walls of the closed tube with the collet under factory conditions, and assembly in the factory or on site is much simplified, and considerable time will be saved as it is simply a matter of inserting the fixing bolts or the special fixing fasteners from the outside of the rails and no internal nuts are required. When it is taken into account that any particular cable management system may include hundreds of collets, the saving in time on any particular overall installation will be considerable, and by virtue of the present invention, a strong structure will result.

It is to be pointed out in any case that whilst the invention has particular application to GRP cable ladder arrangements, it is not to be considered limited thereto, as clearly it can be adopted for any fastening arrangement where closed tubes are to be connected in a secure manner to other members lying transverse thereto.

An embodiment of the present invention will now be described, by way of example, with reference to the accompanying drawings, wherein:

FIG. 1 is a perspective view of a fixing arrangement for a GRP cable ladder rung and rail, and showing the collet of the present embodiment; and FIGS. 2 to 6 are respectively a right hand end view, a side view, a left hand end view, a plan, and a sectional elevation on the line A—A in FIG. 5.

Referring to the drawings, FIG. 1 shows the arrangement clearly, and in this figure a rail 10 of part of a GRP cable ladder made up of a pair of symmetrically arranged rails 10, and a plurality of transverse tubular rungs of which one is indicated by 12, is shown. The tubular rung is of square section in this example, although it could be of any appropriate configuration.

The rail 10 comprises a base section 14 and a pair of flanges 16 and 18. The rung 12 is to be secured to the base section 14 and will usually be arranged in close abutting contact with either flange 16 or flange 18. In this case it will abut flange 18. The rail 12 is fixed to the base section 14 to the inside thereof by means of a bolt 20 and a special collet 22 according to the embodiment of the invention. The collet 22 is basically a block of rectangular cross section which is adapted to fit into the bore 24 of the rail 12 with clearance but in a neat fitting fashion. The collet is bifurcated, or U-shaped, in that it has a central slot 26 which defines two leg sections 28 and 30 which extend from a common end or base section 32. The block is such that the free ends of the legs can be resiliently pushed together in the direction indicated by the arrows 34 when it is desired to push the block into the end of the rung 12. This is necessary because on the outside of the legs there are projections 36 which extend beyond the general cross sectional shape of the block and in use engage in a pair of apertures 38 which are diametrically oppositely provided in the end of the rung 12.

The block 22 finally is provided with a threaded bore 40 which extends for substantially the length of the block and which is for the receipt of the bolt 20. From the description given, the operation of the collet will be understood but briefly it is as follows:

The collet legs 28 and 30 are pushed together as indicated by arrows 34, so that the end of the collet block facing the end of the rung is reduced in width, and it can be pushed into the bore 24. It is pushed in so far until the projections 36 register with the apertures 38, and then the collet can spring back to or towards the original size with the projections 36 located in the apertures 38. Now it is simply a matter of bringing the end of the rung 12 into register with a bore 42 in base section 14 of the rail 10, followed by threaded the bolt 20 through a bore 42 and into bore 40. The collet block tightens against the inner surface of the base of the rail 10, and pulls with it the rung 12 in that the projections 36 engage the edges of the apertures 38 form a lock. The rung 12 is also of GRP, and is of sufficient thickness so that the projections 36 will procure a positive hold on the edges of the apertures 38.

The block 22 is shown in greater detail in FIGS. 2 to 6, and it is to be noted that the thread of the bore lies mainly on the inner surfaces of the legs 28 and 30 and extends for the whole length thereof. It needs not extend for all of the length but should extend for substantially all of the length to provide sufficient fastening effect, having regard to the fact that the threads are of plastic material. Although the block shown in these figures is a commonly used size of 18.5 mm$^2$, in fact it can be of any suitable dimension. Block 22 is a square section apart from chamfered corners 44, and the slot 26 flares outwardly as at 46 towards the end opposite the common end 32. This is to enhance the squeezing together of the ends of the legs 28 and 30.

The projections 36 are cylindrical, but are provided with chamfered sides 36A to enhance the insertion of the collet block into the end of the tube 12.

The legs of the collet may be adapted to be slightly angled together so that the bore is of reducing cross section or may take up this configuration when first inserted in the tube end. The advantage of this is that as the bolt 20 is screwed into the bore 40 so that the legs 28, 30 are pushed apart providing a greater binding effect between the bolt and the collet.

An extremely simple and effective fastening device is provided, and it is especially useful in connection with GRP cable ladders. It can of course be used in any appropriate application requiring strong fixing, where the end of a tubular member is to be connected to another member which lies transversely thereto. The advantage of the arrangement is that fitting is quick and no additional nuts are required for connection to the end of the bolt 20 at inaccessible locations. Also fixing is secure in that the threaded bore has a substantial number of threads making the danger of stripping of the threads and the loosening of the fastening unlikely.

In a load test using a collet of the dimensions indicated above, the fastening suspended a load of 100 kg for seven days without loss of performance.

What is claimed is:

1. A cable ladder assembly comprising
  a closed tube, said closed tube having at least one aperture or internal recess in the walls thereof,
  a side rail having a base section with an aperture therein,
  a threaded bolt, and
  a plastic U-shaped collet having a base and a pair of legs, said base providing resiliency so that the legs at the free ends can be sprung together, one of more of said legs having at least one pip or projection extending onwardly of said one or more legs, said collet furthermore having a collet bore which extends through said base and is partially defined in the inner surfaces of each of said legs, said collet bore being threaded over at least a substantial portion or said legs, wherein the collet is inserted and pushed into an end of the closed tube with clearance but in fitted fashion and the threaded bolt passes through the aperture in the base section of the side rail and is screwed into the collet bore forcing apart the legs and wedging same against the inner surface of the closed tube and both said collet and said closed tube are tightened against and pulled towards the inner surface of the base section of the side rail.

2. An assembly according to claim 1, wherein said collet is oriented such that when said collet is first inserted into the end of said closed tube, said legs are slightly inclined towards each other so that said collet bore tapers.

3. An assembly according to claim 1, wherein a pip or projection is provided on the outsides of each of the respective legs of said collet which are adapted to spring into apertures or internal recesses provided in opposed walls of said closed tube.

4. An assembly according to claim 1, wherein said collet bore is partially formed by an aperture in a common end of said collet, and opposed grooves in the opposite faces of said legs.

5. An assembly according to claim 1, wherein said collet is formed of a plastic material which has sufficient springiness to enable said legs to be resiliently deflected together, and to spring apart when released.

6. An assembly according to claim 1, said collet comprises a block having a core defined by one of more strips of spring steel around which plastic material is formed.

7. An assembly according to claim 1, wherein each projection on said collet comprises a cylindrical protrusion which is chamfered at one side to case the insertion of said collet into the end of said closed tube.

8. An assembly according to claim 1, wherein said collet legs are shaped on their inner surfaces such that the space separating said legs is a constant width from the base to a position intermediate the length of said legs and then progressively increases in width from that position to the free ends of said legs.

* * * * *